United States Patent
Hoaglin

(10) Patent No.: US 7,143,898 B1
(45) Date of Patent: Dec. 5, 2006

(54) END-OF-LINE WATER FILTER

(76) Inventor: Dennis Carl Hoaglin, 107 Terrace Ave., San Rafael, CA (US) 94901

( * ) Notice: Subject to any disclaimer, the term of this patent is extended or adjusted under 35 U.S.C. 154(b) by 0 days.

(21) Appl. No.: 11/385,516

(22) Filed: Mar. 21, 2006

(51) Int. Cl.
*B01D 35/00* (2006.01)
*B01D 35/02* (2006.01)
*B01D 35/28* (2006.01)

(52) U.S. Cl. ............... 210/460; 210/445; 210/448

(58) Field of Classification Search ......... 210/460, 210/435, 445, 447, 448, 449, 450, 451, 452, 210/453, 446
See application file for complete search history.

(56) References Cited

U.S. PATENT DOCUMENTS 1,394,762 A * 10/1921 Schuermann ............ 210/432
3,332,557 A * 7/1967 Pall ..................... 210/495
4,589,688 A * 5/1986 Johnson ................ 285/12
6,390,446 B1 * 5/2002 Wang .................. 251/148

* cited by examiner

*Primary Examiner*—W. L. Walker
*Assistant Examiner*—Benjamin Kurtz
(74) *Attorney, Agent, or Firm*—Risto A. Rinne, Jr.

(57) ABSTRACT

An apparatus for removing debris and scale from a water line includes a first portion that is attached to a faucet or to an appliance conduit that is, in turn, attached to the faucet. A second portion is attached to an existing angle stop valve. A filter screen is disposed in between the first portion and the second portion. The first portion is able to separate apart from the second portion sufficient to allow removal and cleaning or replacement of the filter screen without requiring disconnection of the second portion from the angle stop valve or the first portion from either the faucet or the appliance conduit.

7 Claims, 3 Drawing Sheets

END-OF-LINE WATER FILTER

BACKGROUND OF THE INVENTION

1. Field of the Invention

The present invention, in general, relates to plumbing and, more particularly, to water filters that are used to remove debris.

Water filter and purification systems are, in general, known. For example, charcoal in-line water filtration systems are known. However, these filter systems cannot be used with hot water. Also, they are complex, expensive systems to install, and often require the frequent and expensive replenishment of chemicals, supplies, and other filter components. Their installation requires a plumber and is quite expensive, as are the systems themselves.

All prior art in-line filter systems are installed where the main cold water feed initially enters into the building, whether the building is a commercial office or a residence. These prior art types of systems must be installed at the "front end" of a water plumbing system in order to filter or otherwise treat the water that is then dispersed in many directions through a plurality of water conduit lines.

For example, a certain conduit path exiting from the in-line filter may lead to a tub, toilet, and sink in a first bathroom, another conduit path from the in-line filter may lead to a tub, toilet, and sink in a second bathroom, and yet another conduit path from the in-line filter may lead to a sink and dishwasher in a kitchen. Other additional conduit paths can similarly carry the filtered water from the in-line filter to other locations throughout the house, as required.

Remembering that these systems cannot treat the hot water side (i.e., any hot water conduit path) still another major disadvantage of the prior art in-line filter systems is that, even if they are installed, they do not remove scale and debris that occurs (is formed) in the plumbing conduit (i.e., in the pipes) of the home or business.

For example, galvanized pipes tend to form scale or other types of debris that breaks off and enters the water stream. Galvanized piping is common in most residences and businesses. The scale and debris flows through the various conduit paths until it eventually passes through the kitchen or bathroom faucets, for example. The scale and debris erodes the washers as it passes through any faucet it encounters. This, in turn, prevents full closure of the faucet valve, thereby causing the faucet to drip. As the erosion process continues, the drip becomes faster until it is no longer tolerated.

A costly call to a plumber to replace the washers is then required. However, this does not solve the problem because as soon as the new washers (or other types of replacement parts or seals) are installed, the scale and debris that is generated by the in-house conduits immediately begins eroding the new components.

Additionally, the entire hot water side (i.e., all hot water conduit paths) throughout the home (or business) remain untreated. Accordingly, erosion of their washers (or seals) is likely to occur at an even faster pace than that of the cold water side in a residence or business that includes an in-line water filtering system.

Certain faucet manufacturers provide extended, even lifetime, warrantees for their products. Accordingly, in these instances, it is the manufacturer rather than the homeowner who pays for the repair.

Accordingly, the manufacturers of faucets stand to gain if an economical solution can be found that extends the useful life of their products. It is expected that if such a solution were available, that certain manufactures would mandate such use whenever their faucets are installed in residences or businesses.

Debris in the water lines also occurs with all forms of city water, community water, and water derived from private water-wells. Some of the debris is generated by the conduit present in the residence or business. Some of it enters the building in the water main. Most residences and businesses do not have any type of a water filtering system, simply because they are expensive to install and maintain, as mentioned before. A low cost solution would encourage more widespread usage of a water filter.

The debris that is present dramatically accelerates wear of the washers and other component parts of the faucets. This causes them to drip. When the drip becomes intolerable, as mentioned above, a repair call to a plumber then occurs. Additionally, the solenoids of other types of appliances, for example, dishwashers and washing machines, can also become eroded and start to leak.

The term "appliance" as used herein is intended to refer to any device that is disposed at the end of a water conduit path and which includes a valve or solenoid for enabling or disabling the flow of water therein.

Drips that are not repaired are also expensive. A fast drip can waste large quantities of water, which many residents and businesses pay for by the gallon from their local water company. If the leak (i.e., drip) is occurring on a hot water side, a great deal of energy that is required to heat the water is also being wasted.

Accordingly, there exists today a need for an end-of-line water debris filter that helps ameliorate the above-mentioned problems and difficulties.

Clearly, such an apparatus would be an especially useful and a desirable device.

2. Description of Prior Art

Water filters as mentioned above are, in general, known. While the structural arrangements of the above described devices may, at first appearance, have certain similarities with the present invention, they differ in material respects. These differences, which will be described in more detail hereinafter, are essential for the effective use of the invention and which admit of the advantages that are not available with the prior devices or systems.

OBJECTS AND SUMMARY OF THE INVENTION

It is an object of the present invention to provide an end-of-line water debris filter that is inexpensive to manufacture.

It is also an important object of the invention to provide an end-of-line water debris filter that is inexpensive to install.

Another object of the invention is to provide an end-of-line water debris filter that can be installed by an unskilled person.

Still another object of the invention is to provide an end-of-line water debris filter that is installed prior to a faucet and after a shut off valve that controls the flow of water through that conduit path.

Still yet another object of the invention is to provide an end-of-line water debris filter that can be used with a cold water line.

Yet another important object of the invention is to provide an end-of-line water debris filter that can be used with a hot water line.

Still yet another important object of the invention is to provide an end-of-line water debris filter that includes means for cleaning the filter in-situ (i.e., in location).

A first continuing object of the invention is to provide an end-of-line water debris filter that includes means for separating the filter sufficient to remove a portion thereof for cleaning or replacement.

A second continuing object of the invention is to provide an end-of-line water debris filter that is adapted for use with a common angle-stop type of valve that is used for controlling the flow of water to a cold water faucet.

A third continuing object of the invention is to provide an end-of-line water debris filter that is adapted for use with a common angle-stop type of valve that is used for controlling the flow of water to a hot water faucet.

A fourth continuing object of the invention is to provide an end-of-line water debris filter that helps prevent deterioration of a faucet.

A fifth continuing object of the invention is to provide an end-of-line water debris filter that helps prolong a duration of time until a faucet begins to drip.

A sixth continuing object of the invention is to provide an end-of-line water debris filter that can eliminate or delay the need for repair of a faucet.

A seventh continuing object of the invention is to provide an end-of-line water debris filter that, if used, can benefit the manufacturer of a faucet by decreasing the need for repair or replacement of the faucet.

An eighth continuing object of the invention is to provide an end-of-line water debris filter that permits a maximum flow rate of water to occur through the filter.

A ninth continuing object of the invention is to provide an end-of-line water debris filter that can easily be retrofitted for use and installation prior to the hot or cold line leading to an existing faucet or appliance that includes a valve or solenoid for regulating a flow of water.

A tenth continuing object of the invention is to provide an end-of-line water debris filter that can be modified for new construction installation prior to the hot or cold line leading to an existing faucet or appliance.

An eleventh continuing object of the invention is to provide an end-of-line water debris filter that, if used, can benefit the manufacturer of an appliance by decreasing the need for repair or replacement of the appliance wherein the appliance includes a valve or a solenoid for regulating a flow of water.

A twelfth continuing object of the invention is to provide an end-of-line water debris filter that can be installed by a plumber.

A thirteenth continuing object of the invention is to provide an end-of-line water debris filter that can be installed by a homeowner or other unskilled person.

A fourteenth continuing object of the invention is to provide an end-of-line water debris filter that includes a filter that can be cleaned by a homeowner or other unskilled person without having to disconnect the water debris filter apart from a faucet or appliance that is served by the water conduit path.

Briefly, an end-of-line water debris filter that is constructed in accordance with the principles of the present invention has a first portion, a filter screen, and a second portion. The first portion is adapted for attachment to a conduit that extends to and is attached to either the cold or hot input side of a faucet or other type of appliance. If desired, the first portion could be modified to connect directly to the faucet or other type of appliance. The second portion is adapted for attachment to a shut-off valve for either a cold or a hot water line that is disposed in an accessible location, typically under a sink. Means are provided for detachably-attaching the first portion apart from the second portion without affecting the attachment of the first portion to the conduit (or appliance) or affecting the attachment of the second portion to the valve. The filter screen is disposed between the first portion and the second portion when they are assembled together. The filter screen catches scale and other debris and prevents the debris from reaching the faucet. When a substantial amount of debris has been retained by the filter screen, a drop in the flow rate of either the hot or cold water, or both, through the faucet is observed. A simple detachment of the first portion apart from the second portion exposes the filter screen for removal and easy cleaning, or if preferred, its rare replacement. The clean or replacement filter screen is then inserted in the filter intermediate the first portion and the second portion. The first portion and the second portion are then joined together with the filter screen serving to seal the end-of-line water debris filter, help prevent water leaks, and restore the normally high volume of flow of water through the faucet. In this manner the device can be retrofitted to old (existing) construction. For new construction a modified valve is used that eliminates the need for the second portion and which secures the filter screen in position.

DETAILED DESCRIPTION OF THE INVENTION

Figure 1:
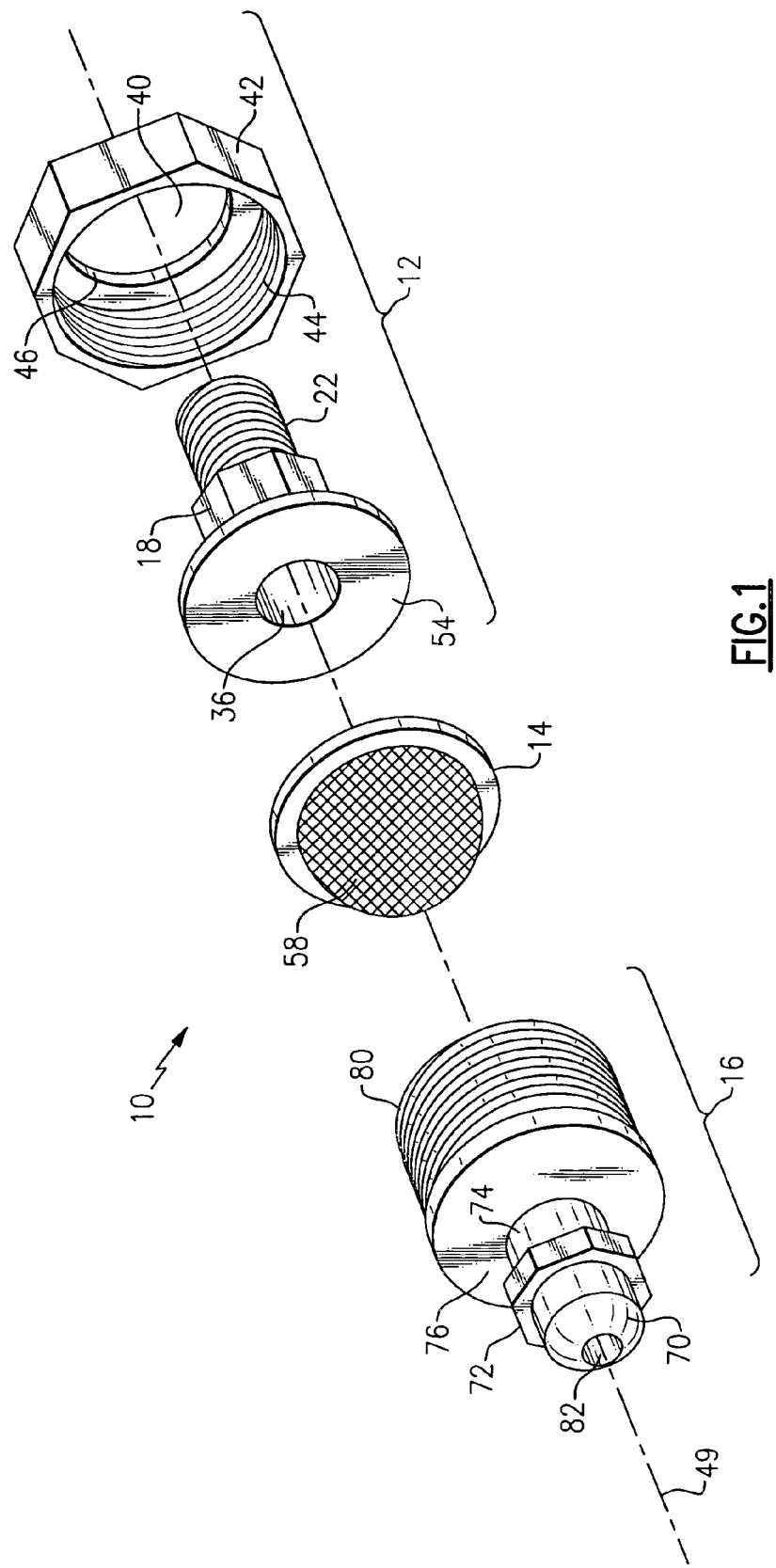
FIG. 1 is an exploded view in perspective of an end-of-line water debris filter for installation prior to a faucet or appliance in an existing system (i.e., old construction), and of which a portion thereof is used for new construction.

Referring on occasion to all of the FIGURES and now in particular to FIG. 1, is shown, a first embodiment of an end-of-line water debris filter, identified in general by the reference numeral 10.

All component parts of the end-of-line water debris filter 10 are made of brass or any other preferred material, except when noted otherwise.

The end-of-line water debris filter 10 includes a first portion, identified in general by the reference numeral 12, a filter screen 14, and a second portion, identified in general by the reference numeral 16.

The first portion 12 and the filter screen 14 are main component parts that are used in all embodiments of the instant invention (i.e., for old or new construction). The first portion 12 and the filter screen 14 can, of course, be modified to include a different size or type of threads as desired without departing from the spirit and scope of the invention.

Figure 3:
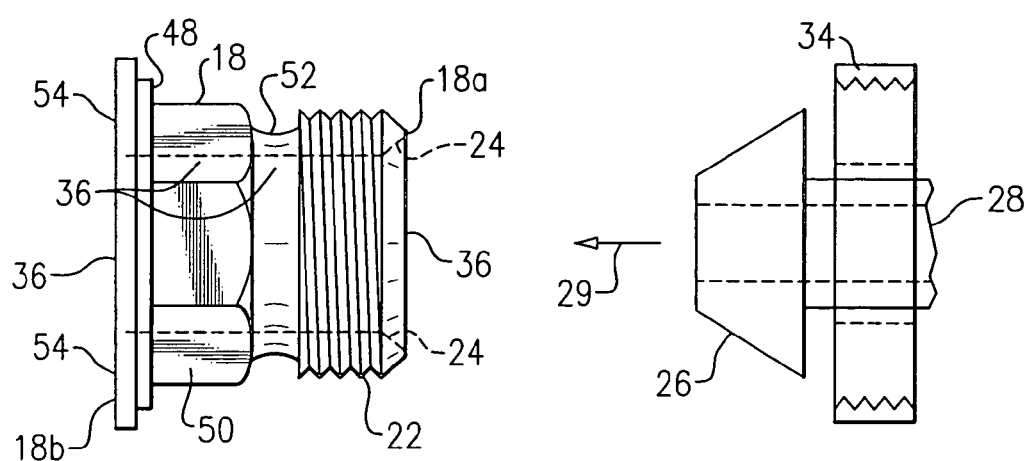
FIG. 3 is a side view of an inner member of a first portion of the end-of-line water debris filter that is used with either version thereof and a portion of an appliance conduit that disposed in a spaced-apart orientation with respect to the inner member, prior to its final assembly.

The first portion 12 includes an inner member 18 and a hex nut portion 50. See FIG. 3 and FIG. 4. The inner member 18 includes a threaded end 18a that includes outside threads 22 and on the inside of the threaded end 18a is found a socket portion 24 of a well known type of a ball and socket plumbing connection.

When assembled, a ball end 26 of an appliance conduit 28 is pressed against the socket portion 24 of the inner member 18 by urging it in a direction as shown by arrow 29. This type of a connection is generally referred to as a "compression type of fit" of a "compression fitting" in the plumbing arts.

Figure 2:
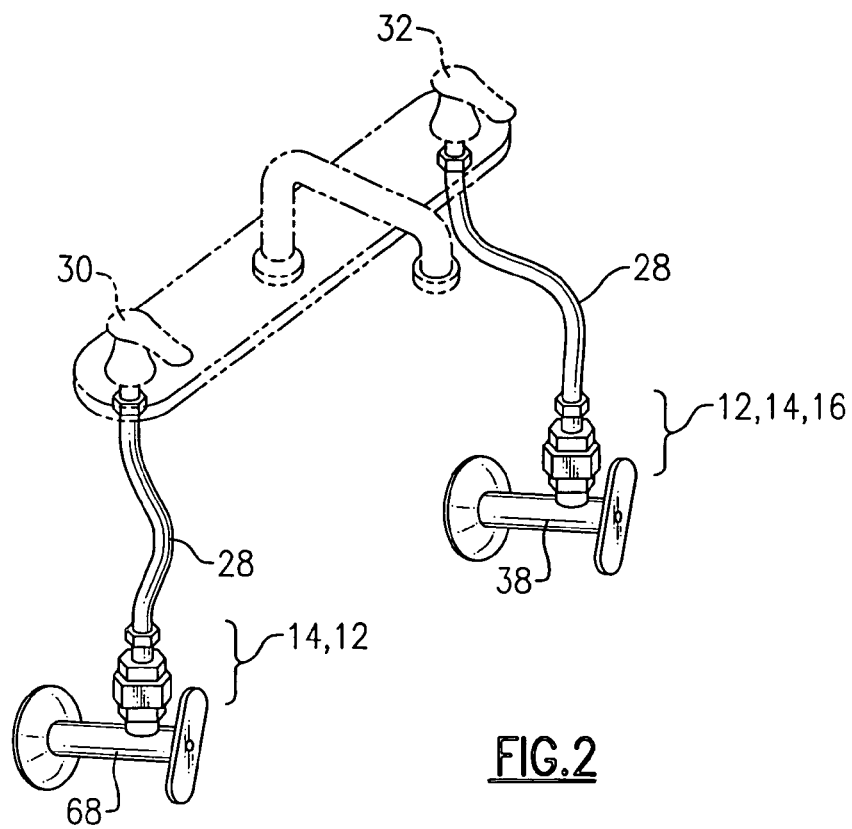
FIG. 2 is view in perspective of an end-of-line water debris filter for use with old construction and also a modified end-of-line water filter for use in new construction that have each been installed prior to a cold faucet and a hot faucet, respectively.

The appliance conduit 28 leads directly to a preferred appliance, the preferred appliance typically being either a hot water faucet 30 or a cold water faucet 32 (See also FIG. 2, dashed lines). The preferred appliance could also include a dishwasher or a clothes washing machine or other device providing the device includes either a valve or a solenoid for regulating the flow of water.

While it is possible to install the end-of-line water debris filter 10 prior to a supply of water reaching a device that does not include a valve or a solenoid, it is expected that most applications of the end-of-line water debris filter 10 will be prior to faucets and appliances that do somehow regulate the flow of water. This is because the end-of-line water debris filter 10 is able to extend the useful life of faucets and water-flow regulating appliances.

It is important to note that nothing other than the appliance conduit 28 is disposed between the end-of-line water debris filter 10 and the appliance, that is, either the hot water faucet 30 or the cold water faucet 32, as shown in FIG. 2. If desired, another type of appliance could be used instead of the faucets 30, 32.

This proximal placement of the end-of-line water debris filter 10 near to the faucets 30, 32 (or appliance) is important because it helps ensure that a substantial amount of the debris or scale that is generated by the plumbing system of the residence or business as well as any that entered the residence or business through the main water inlet is captured by the filter screen 14 and that the debris or scale does not therefore reach either faucet 30, 32.

Accordingly, the end-of-line water debris filter 10 is disposed at the end of each conduit path, just after a valve (as is identified and described in greater detail hereinafter) and just prior to the final short appliance conduit 28 before the water is discharged into whatever appliance (i.e., faucet 30, 32) is connected to the other end of the appliance conduit 28.

In certain situations, it may be possible to dispose the end-of-line water debris filter 10 directly before the appliance (i.e., the faucet 30, 32) and not use the appliance conduit 28, but that is not usually expected to occur. In such instances, the end-of-line water debris filter 10 is modified for attachment directly to the faucet 30, 32 by changing the end-of-line water debris filters 10 type or size of mechanical connection hardware.

However, no other length of conduit or other type of device or other type of appliance, other than the short appliance conduit 28, is disposed between the end-of-line water debris filter 10 and the final appliance (i.e., the faucet 30, 32) that is being served (i.e., the water that is being filtered) by the end-of-line water debris filter 10. It is this unique location for the end-of-line water debris filter 10 that makes it a filter for the end of each conduit path, that is, at the end of the water line, just after the final shut-off valve (as is described in greater detail hereinafter).

The appliance conduit 28 is formed of a material that generally does not produce scale or debris. Furthermore, it is of such a very short and standard length that makes it insignificant with regard to the overall generation of scale or debris by the appliance conduit 28.

The appliance conduit 28 includes well-known connections in the plumbing arts at each end thereof, which are usually compression type fittings of various sizes.

A conduit nut 34 includes inside threads that correspond with the outside threads 22 of the inner member 18. The outside threads 22 of the inner member 18 are usually three-eights of an inch in size although other sizes such as one-quarter of an inch or even one-half of an inch are possible. The outside threads 22 are manufactured accordingly to correspond with the thread size of the conduit nut 34.

The conduit nut 34 is a well-known plumbing component and is tightened to the outside threads 22, thereby urging the ball end 26 of the appliance conduit 28 tightly against the socket portion 24 and sealing the connection (i.e., the compression fit) therebetween.

It is also important to note that this connection (between the ball end 26 and the socket portion 24) does not have to be broken (i.e., separated) when it is desirable to clean the filter screen 14 of the end-of-line water debris filter 10, as is described in greater detail hereinafter.

This provides an unexpected benefit of preventing future leaks from occurring at the junction of the ball end 26 and the socket portion 24 which, being malleable, do not well-accommodate repeat separations and connections. This extends the useful life of both the end-of-line water debris filter 10 and of the appliance conduit 28.

The inner member 18 includes an inner member opening 36 that extends from the threaded end 18a to an opposite shoulder end 18b of the inner member 18, entirely through the inner member 18.

The appliance conduit 28 is usually flexible and does not typically exceed 24 inches in length and never exceeds 36 inches in length. The appliance conduit 28 is formed of a single length of conduit and is flexible so that it can adjust for any misalignment between an outlet port of an angle stop valve 38 and the inlet of the faucet 32 (As shown, the angle stop valve 38 is connected to the cold water faucet 32 in FIG. 2).

Figure 4:
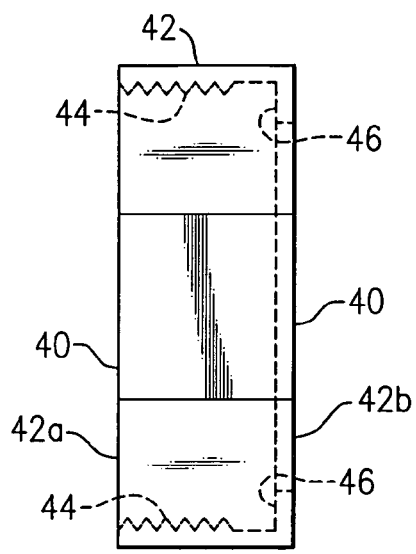
FIG. 4 is a side view of a nut of a first portion of the end-of-line water debris filter that is used with either version thereof.

Before the ball end 26 and the conduit nut 34 are threaded onto the outside threads 22 of the inner member 18, the threaded end 18a of the inner member 18 is inserted through an opening 40 in a nut 42 (see FIG. 1 and also FIG. 4). The nut 42 includes inside nut threads 44 that are preferably sized to match those of a typical garden hose type of connection.

The opening 40 is largest at a first nut end 42a and smaller in diameter at an opposite second nut end 42b. A smooth ridge 46 extends radially around the opening 40 at the second nut end 42b thereof from the opening 40 to an location in the nut 42 that is near the inside nut threads 44.

The opposite shoulder end 18b of the inner member 18 is generally smooth and it includes an outside diameter that is greater than the diameter of the opening 40 at the second nut end 42b, which it bears against when the threaded end 18a of the inner member 18 is inserted through the opening 40.

Adjacent to the opposite shoulder end 18b of the inner member 18 an inner ridge 48 that includes an outside diameter that is slightly less than that of the opening 40 at the second nut end 42b. Accordingly, when the threaded end 18a of the inner member 18 is inserted through the opening 40, the inner ridge 48 is disposed in the opening 40 at the second nut end 42b.

It is important to note that the inner member 18 is able to rotate about a center longitudinal axis 49 (dashed line, FIG. 1) thereof while it is seated in position in the nut 42.

The hex nut portion 50 is attached adjacent to the inner ridge 48 and is used to grasp the inner member 18 during tightening and loosening thereof to the appliance conduit 28.

Attached intermediate the hex nut portion 50 and the outside threads 22 portion of the inner member 18 is a short section of conduit 52, as desired. The short section of conduit 52 allows room for adequately tightening the conduit nut 34.

After the inner member 18 has been fully inserted into the nut 42, the filter screen 14 is then inserted in the inside nut threads 44 of the nut 42 and up against a radial surface 54 of the inner member 18. The radial surface 54 is disposed maximally away from the threaded end 18a and includes that area that is disposed around the inner member opening 36. The inner member opening 36 extends from end to end of the inner member 18.

Figure 6:
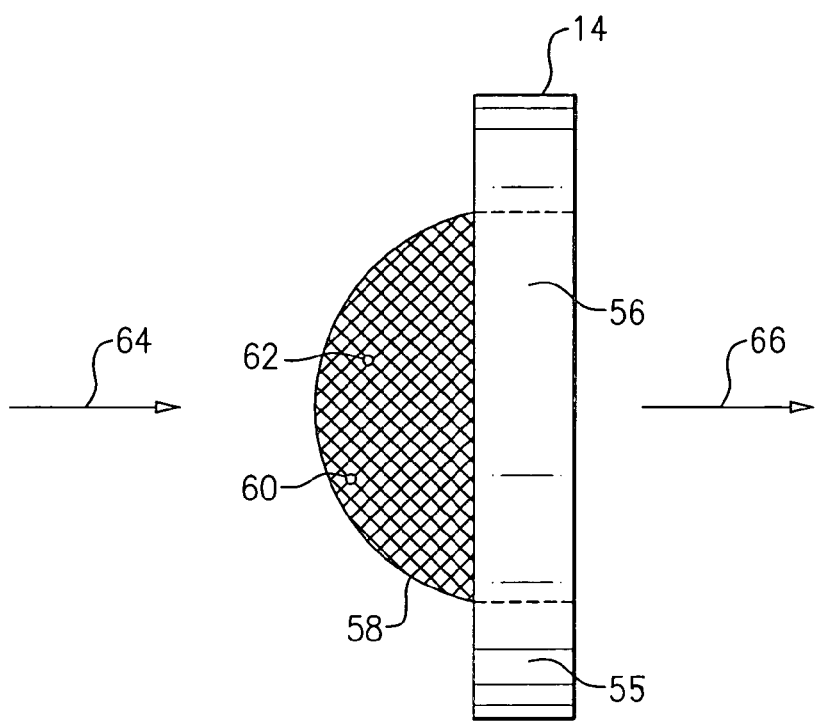
FIG. 6 is a side view of a filter screen of the end-of-line water debris filter that is used with either version thereof.

Referring momentarily to FIG. 6, the filter screen 14 includes a flexible donut or toroid-shaped elastomeric rim 55 that includes a center opening 56 there-through. The elastomeric rim 55 is typically formed of rubber, neoprene, or a flexible type of plastic. A concave mesh screen 58 is embedded in the elastomeric rim 55 sufficient to retain it in position. The mesh screen 58 is formed of stainless steel, brass, or any other desired material.

The mesh screen 58 traps scale 60 and debris 62 from unfiltered water that is represented by arrow 64. After passing through the mesh screen 58, filtered water that is represented by arrow 66 continues to flow through the inner member opening 36 and eventually through the appliance conduit 28 and eventually to the faucet 32.

Accordingly, scale 60 and debris 62 are prevented from reaching the faucet 32, thereby extending its useful life.

The filter screen 14 is a currently existing product and is therefore inexpensive. It is the remainder of the component parts, as described herein, that have been invented and further modified to effectively contain the filter screen 14, not leak, allow use in either old or new construction, permit disassembly without disconnection of the faucet 30, 32 or other appliance, and in general to provide all of the substantial benefits that are herein described.

The mesh screen 58 side of the filter screen 14 is disposed away from the radial surface 54 of the inner member 18 when the filter screen 14 is inserted in the inside nut threads 44.

For new construction applications that are intended to use the instant invention, a modified embodiment thereof is preferred that includes a modified valve 68 (FIG. 2). The modified valve 68 is identical to the old construction, prior art type of the angle stop valve 38 except that for its outlet port it includes male garden hose threads that mate with the inside nut threads 44 of the nut 42.

The use of the modified valve 68 therefore eliminates the need to include any of the second portion 16. This further speeds installation of the end-of-line water debris filter 10 and can reduce product manufacturing cost by eliminating the second portion 16 and also the cost of installation by eliminating the installation of the second portion 16.

Therefore, as shown in FIG. 2, the modified version of the end-of-line water debris filter 10 is attached to the hot water side and it includes the first portion 12, which comprises the inner member 18 and the nut 42, and also the filter screen 14. Accordingly, the hot water faucet 30 is similarly provided with benefit of the filtered water 66 and the useful life of the hot water faucet 30 is similarly extended.

Of course, either type of faucet (30 or 32) could include either type of valve (38 or 68) or either version of the end-of-line water debris filter 10. Typically both faucets 30, 32 will include the same type of valve (either 38 or 68) and therefore the same version (either with or without the second portion 16) of the end-of-line water debris filter 10.

Figure 5:
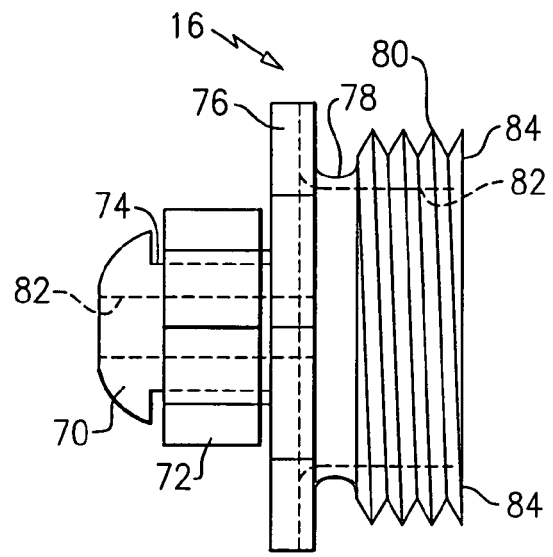
FIG. 5 is a side view of a second portion of the end-of-line water debris filter of FIG. 1 that is used only with old construction that includes a prior art type of an angle stop valve.

Referring now momentarily to FIG. 5, the second portion 16 includes a second ball end 70 and a second nut 72. The second ball end 70 is identical to the ball end 26 which is found on the end of the appliance conduit 28. The second nut 72 is similarly identical to the conduit nut 34.

The second portion 16 is used primarily to retrofit the end-of-line water debris filter 10 with old construction that includes a prior art type of the angle stop valve 38. With old construction that does not include the end-of-line water debris filter, the ball end 26 and the conduit nut 34 of the appliance conduit 28 are originally attached to the angle stop valve 38.

To install the end-of-line water debris filter 10 with old construction, the ball end 26 is separated from the angle stop valve 38 and by loosening the conduit nut 34. The ball end 26 and conduit nut 34 are then attached, as was described hereinbefore, to the outside threads 22 of the inner member 18, which includes an identical thread size and compression fitting size as did the angle stop valve 38.

The second ball end 70 is then attached to the angle stop valve 38 using the second nut 72. It is of course to be understood that a possible assembly sequence is being described herein and is not intended to be, in any way, limiting. Other assembly sequences will also become apparent to those possessing ordinary skill in the art.

A short rigid conduit 74 extends from the second ball end 70 to a first side of a large nut 76. A second short section of conduit 78 that is similar in size and purpose to the short section of conduit 52, only larger in diameter, is attached to an opposite side of the large nut 76 as compared to the rigid conduit 74.

The second short section of conduit 78 extends to male garden hose threads 80 that are adapted to mate with the inside nut threads 44.

The second nut 72 is able to rotate about the center longitudinal axis 49 with respect to the rigid conduit 74. The rigid conduit 74 is attached to the large nut 76 and it does not rotate with respect to the large nut 76.

A second portion opening 82 extends from end to end of the second portion 16 to allow the unfiltered water 64 to flow there-through.

For old construction, after the appliance conduit 28 has been secured to the inner member 18 and the first portion 16 has been secured to the angle stop valve 38, the filter screen 14 is inserted into the inside nut threads 44.

The inside nut threads 44 are then engaged with the 80 and the nut 42 is turned while holding the large nut 76 secure and preventing it from rotating. This forces the filter screen 14 to bear against the radial surface 54 on one side thereof and against a lip 84 of the second portion 16.

This then seals the end-of-line water debris filter 10 so that it does not, of itself, leak. It also allows disassembly thereof by preventing rotation of the large nut 76 while loosening the nut 42.

With old construction or new construction, the connection of the end-of-line water debris filter 10 to the appliance conduit 28 is not affected by repeated assembly or disassembly of the end-of-line water debris filter 10 because no separation thereof is required.

With old construction, the connection of the end-of-line water debris filter 10 to the angle stop valve 38 is similarly not affected by repeated assembly or disassembly of the end-of-line water debris filter 10 because no separation thereof is required.

If the flow of filtered water 66 through either the hot faucet 30 or the cold faucet 32 decreases, it can be assumed that the filter screen 14 has become dirty and is in need of cleaning.

The first portion 12 of the affected end-of-line water debris filter 10 is separated apart from the second portion 16, the filter screen 14 is removed and it is cleaned, and then reinserted.

The first portion 12 is then secured to the second portion 16, and the normal high volume flow of water is once again resumed. Rarely, the filter screen 14 will become damaged or worn and when this happens it is replaced with a new one.

When the modified valve 68 is used instead of the angle stop valve 38 (i.e., for new construction that includes the modified valve 68), then the second portion 16 is not used. The inside nut threads 44 are then mated with the garden hose threads of the outlet port of the modified valve 68 instead of to the male garden hose threads 80 of the second portion 16.

The modified valve 68 is grasped and secured with a tool, such as a wrench, to prevent it from excessively moving when the nut 42 is tightened for attachment or when it is loosened for cleaning of the filter screen 14.

As many of the end-of-line water debris filters 10 are used as there are appliances (i.e., faucets 30, 32 or other appliances) in the residence, home, business, or commercial building at the end of each water conduit path, including either hot or cold water.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An end-of-line water debris filter, comprising:
    (a) a first portion that includes means for attaching an end of said first portion to a first end of an appliance conduit, said appliance conduit including a second opposite end that is connected to an appliance at the end of conduit path used to deliver water to said appliance, and wherein said appliance conduit does not exceed three feet in length, and wherein said first portion includes a nut and an inner member, and wherein said inner member includes a radial surface that is disposed at a first end of said inner member and including an inner ridge that is disposed on an opposite side of said radial surface, and including a hex nut that is disposed adjacent to said inner ridge, and including a section of conduit that is disposed at a first end thereof adjacent to said hex nut and wherein said section of conduit includes an opposite end that is disposed adjacent to outside threads, and including an inner member opening that extends through said radial surface, said hex nut, said section of conduit, and said outside threads and wherein said outside threads, said section of conduit, and said hex nut are adapted to pass through an opening provided in said nut and wherein said inner member is adapted to rotate about a longitudinal axis thereof with respect to said nut;
    (b) a filter screen disposed in contact with said first portion, said filter screen including a mesh that is sufficiently fine to prevent the flow of a substantial amount of debris or scale to said appliance;
    (c) means for attaching said end-of-line water debris filter to a water supply valve;
    (d) means for removing said filter screen apart from said end-of-line water debris filter without having to disconnect either said first end of said appliance conduit from said end-of-line water debris filter or said water supply valve from said end-of-line water debris filter; and wherein said filter screen is formed of a sufficiently flexible material and wherein said mesh is attached to said flexible material, and wherein said flexible material is adapted to provide a seal intermediate said radial surface and said filter screen.

2. The end-of-line water debris filter of claim 1 wherein said means for attaching an end of said first portion to a first end of an appliance conduit includes said inner member and wherein said inner member includes a compression fitting at a first end thereof and wherein said outside threads proximate said compression fitting are adapted to mate with a corresponding conduit nut and a corresponding ball end of said appliance conduit.

3. The end-of-line water debris filter of claim 1 wherein said flexible material includes an elastomer.

4. The end-of-line water debris filter of claim 1 wherein said means for attaching said end-of-line water debris filter to a water supply valve includes said nut, and wherein said nut including female inside threads that include a thread size of a conventional garden hose, and wherein said inside threads are adapted to mate with corresponding outside garden hose threads of said water supply valve.

5. The end-of-line water debris filter of claim 1 wherein said means for attaching said end-of-line water debris filter to a water supply valve includes a second portion, said second portion including male garden hose threads at one end thereof that are adapted to mate with female inside threads of said nut that include a thread size of a conventional garden hose, said nut attached to said first portion and adapted to rotate about said longitudinal axis thereof with respect to a remainder of said first portion.

6. The end-of-line water debris filter of claim 5 including a compression fitting disposed at an end of said second portion that is opposite with respect to said male garden hose threads, said compression fitting adapted to mate with said water supply valve.

7. An end-of-line water debris filter, comprising:
    (a) a first portion that includes means for attaching an end of said first portion to a first end of an appliance conduit, said appliance conduit including a second opposite end that is connected to an appliance at the end of conduit path used to deliver water to said appliance, and wherein said appliance conduit does not exceed three feet in length and wherein said means for attaching an end of said first portion to a first end of an appliance conduit includes an inner member that includes a compression fitting at a first end thereof and outside threads proximate said compression fitting that are adapted to mate with a corresponding conduit nut and a corresponding ball end of said appliance conduit, and wherein said first portion includes a nut and an inner member, and wherein said inner member includes a radial surface that is disposed at a first end of said inner member and including an inner ridge that is disposed on an opposite side of said radial surface, and including a hex nut that is disposed adjacent to said inner ridge, and including a section of conduit that is disposed at a first end thereof adjacent to said hex nut and wherein said section of conduit includes an opposite end that is disposed adjacent to outside threads, and including an inner member opening that extends through said radial surface, said hex nut, said section of conduit, and said outside threads and wherein said outside threads, said section of conduit, and said hex nut are adapted to pass through an opening provided in said nut and wherein said inner member is adapted to rotate about a longitudinal axis thereof with respect to said nut;

(b) a filter screen disposed in contact with said first portion, said filter screen including a mesh that is sufficiently fine to prevent the flow of a substantial amount of debris or scale to said appliance and wherein said filter screen is formed of a sufficiently flexible material and wherein said mesh is attached to said flexible material, and wherein said flexible material is adapted to provide a seal intermediate said radial surface and said filter screen;

(c) means for attaching said end-of-line water debris filter to a water supply valve and wherein said means for attaching said end-of-line water debris filter to a water supply valve includes a second portion, said second portion including male garden hose threads at one end thereof that are adapted to mate with female inside threads of a nut that include a thread size equal to that of a conventional garden hose, said nut attached to said first portion and adapted to rotate about a longitudinal axis thereof with respect to a remainder of said first portion;

(d) means for removing said filter screen apart from said end-of-line water debris filter without having to disconnect either said first end of said appliance conduit from said end-of-line water debris filter or said water supply valve from said end-of-line water debris filter; and (e) wherein said seal of said flexible material provides a water-tight seal intermediate said filter screen and said first portion and intermediate said filter screen and said second portion when said first portion is properly attached to said second portion.

* * * * *